(12) United States Patent
Zomet

(10) Patent No.: US 9,438,759 B2
(45) Date of Patent: Sep. 6, 2016

(54) METHOD AND SYSTEM FOR ADJUSTING DEPTH VALUES OF OBJECTS IN A THREE DIMENSIONAL (3D) DISPLAY

(71) Applicant: HumanEyes Technologies Ltd., Jerusalem (IL)

(72) Inventor: Assaf Zomet, Jerusalem (IL)

(73) Assignee: HumanEyes Technologies Ltd., Jerusalem (IL)

( * ) Notice: Subject to any disclaimer, the term of this patent is extended or adjusted under 35 U.S.C. 154(b) by 30 days.

(21) Appl. No.: 14/616,808

(22) Filed: Feb. 9, 2015

(65) Prior Publication Data

US 2015/0154788 A1    Jun. 4, 2015

Related U.S. Application Data

(63) Continuation of application No. 13/521,249, filed as application No. PCT/IL2011/000048 on Jan. 13, 2011, now Pat. No. 8,953,871.

(60) Provisional application No. 61/294,843, filed on Jan. 14, 2010.

(51) Int. Cl.
  *G06T 15/00*    (2011.01)
  *H04N 13/04*    (2006.01)
  (Continued)

(52) U.S. Cl.
  CPC .......... *H04N 1/00734* (2013.01); *G02B 3/005* (2013.01); *G03B 25/02* (2013.01); *G03B 35/14* (2013.01); *G03B 35/24* (2013.01); *G06F 3/04842* (2013.01); *G06T 15/005* (2013.01); *H04N 1/00201* (2013.01); *H04N 1/23* (2013.01); *H04N 13/0018* (2013.01); *H04N 13/0022* (2013.01); *H04N 13/0404* (2013.01); *H04N 13/0415* (2013.01); *H04N 13/0425* (2013.01); *G02B 27/2214* (2013.01)

(58) Field of Classification Search
  None
  See application file for complete search history.

(56) References Cited

U.S. PATENT DOCUMENTS

| 5,503,152 | A | 4/1996 | Oakley et al. |
| 5,924,870 | A | 7/1999 | Brosh et al. |

(Continued)

FOREIGN PATENT DOCUMENTS

| EP | 0751689 | 1/1997 |
| EP | 0791847 | 8/1997 |

(Continued)

OTHER PUBLICATIONS

Notice of Reason for Rejection Dated Sep. 4, 2015 From the Japanese Patent Office Re. Application No. 2012-548535 and Its Translation Into English.

(Continued)

*Primary Examiner* — David F Dunphy

(57) ABSTRACT

A method of setting a plurality of depth values of a plurality of objects in a scene. The method comprises providing an image dataset depicting a scene comprising a plurality of objects having a plurality of depth values with a plurality of depth differences thereamong, selecting a depth range, simultaneously adjusting the plurality of depth values while maintaining the plurality of depth differences, the adjusting being limited by the depth range, and instructing the generation of an output image depicting the scene so that the plurality of objects having the plurality of adjusted depth values.

17 Claims, 4 Drawing Sheets
(1 of 4 Drawing Sheet(s) Filed in Color)

(51) Int. Cl.
*H04N 13/00* (2006.01)
*H04N 1/00* (2006.01)
*H04N 1/23* (2006.01)
*G02B 3/00* (2006.01)
*G03B 25/02* (2006.01)
*G03B 35/14* (2006.01)
*G03B 35/24* (2006.01)
*G06F 3/0484* (2013.01)
*G02B 27/22* (2006.01)

(56) References Cited

U.S. PATENT DOCUMENTS

| | | | |
|---|---|---|---|
| 5,959,718 | A | 9/1999 | Morton |
| 6,373,637 | B1 | 4/2002 | Gulick, Jr. et al. |
| 6,406,428 | B1 | 6/2002 | Mittelstaedt |
| 7,477,450 | B2 | 1/2009 | Abe |
| 7,746,554 | B2 | 6/2010 | Katsura et al. |
| 7,929,182 | B2 * | 4/2011 | Mochizuki ............ G06T 11/60 358/2.1 |
| 8,854,684 | B2 | 10/2014 | Zomet |
| 2002/0126202 | A1 | 9/2002 | Wood et al. |
| 2003/0026474 | A1 | 2/2003 | Yano |
| 2003/0035555 | A1* | 2/2003 | King ............ H03G 5/005 381/103 |
| 2004/0233222 | A1* | 11/2004 | Lee ............ G06F 3/0481 345/621 |
| 2005/0033160 | A1 | 2/2005 | Yamagata et al. |
| 2005/0191104 | A1 | 9/2005 | Goggins |
| 2005/0248850 | A1 | 11/2005 | Goggins |
| 2006/0066879 | A1 | 3/2006 | Bast et al. |
| 2006/0072175 | A1 | 4/2006 | Oshino |
| 2006/0088206 | A1 | 4/2006 | Era |
| 2006/0115180 | A1 | 6/2006 | Adams et al. |
| 2006/0120593 | A1 | 6/2006 | Oshino |
| 2008/0151198 | A1 | 6/2008 | Hine |
| 2009/0141123 | A1 | 6/2009 | Conley |
| 2009/0213210 | A1 | 8/2009 | Conley |
| 2010/0099991 | A1 | 4/2010 | Snyder |
| 2011/0116058 | A1 | 5/2011 | Ota et al. |
| 2011/0157155 | A1* | 6/2011 | Turner ............ G06T 19/00 345/419 |
| 2012/0127497 | A1 | 5/2012 | Zomet et al. |
| 2012/0287447 | A1 | 11/2012 | Zomet |
| 2012/0288184 | A1 | 11/2012 | Zomet |
| 2014/0362388 | A1 | 12/2014 | Zomet |

FOREIGN PATENT DOCUMENTS

| | | |
|---|---|---|
| EP | 0805041 | 11/1997 |
| EP | 1343334 | 9/2003 |
| EP | 1683485 | 7/2006 |
| JP | 06-149957 | 5/1994 |
| JP | 09-074573 | 3/1997 |
| JP | 09-236777 | 9/1997 |
| JP | 2003-209858 | 7/2003 |
| JP | 2003-284098 | 10/2003 |
| JP | 2003-348621 | 12/2003 |
| JP | 2004-248213 | 9/2004 |
| JP | 2005-165614 | 6/2005 |
| JP | 2005-169070 | 6/2005 |
| JP | 2006-107213 | 4/2006 |
| JP | 2006-163278 | 6/2006 |
| JP | 2006-204920 | 8/2006 |
| WO | WO 2005/084298 | 9/2005 |
| WO | WO2005/084298 * | 9/2005 ............ G06T 15/00 |
| WO | WO 2008/087632 | 7/2008 |

OTHER PUBLICATIONS

Advisory Action Before the Filing of an Appeal Brief Dated Jun. 9, 2014 From the US Patent and Trademark Office Re. U.S. Appl. No. 13/388,069.
Communication Pursuant to Article 94(3) EPC Dated Apr. 13, 2015 From the European Patent Office Re. Application No. 11703264.9.
Communication Under Rule 71(3) EPC Dated Jul. 26, 2013 From the European Patent Office Re. Application No. 11710028.9.
Decision of Rejection Dated Jan. 6, 2015 From the Japanese Patent Office Re. Application No. 2012-523435.
International Preliminary Report on Patentability Dated Feb. 16, 2012 From the International Bureau of WIPO Re. Application No. PCT/IL2010/000632.
International Preliminary Report on Patentability Dated Jul. 26, 2012 From the International Bureau of WIPO Re. Application No. PCT/IL2011/000046.
International Preliminary Report on Patentability Dated Jul. 26, 2012 From the International Bureau of WIPO Re. Application No. PCT/IL2011/000048.
International Search Report and the Written Opinion Dated May 4, 2011 From the International Searching Authority Re. Application No. PCT/IL2011/000048.
International Search Report and the Written Opinion Dated Dec. 7, 2010 From the International Searching Authority Re. Application No. PCT/IL2010/000632.
International Search Report and the Written Opinion Dated May 16, 2011 From the International Searching Authority Re. Application No. PCT/IL2011/000047.
International Search Report and the Written Opinion Dated May 17, 2011 From the International Searching Authority Re. Application No. PCT/IL2011/000046.
Notice of Allowance Dated Jun. 16, 2014 From the US Patent and Trademark Office Re. U.S. Appl. No. 13/521,252.
Notice of Allowance Dated Oct. 21, 2014 From the US Patent and Trademark Office Re. U.S. Appl. No. 13/521,249.
Notice of Allowance Dated Feb. 25, 2015 From the US Patent and Trademark Office Re. U.S. Appl. No. 14/468,395.
Notice of Reason for Rejection Dated Aug. 1, 2014 From the Japanese Patent Office Re. Application No. 2012-523435 and Its Translation Into English.
Notice of Reason for Rejection Dated Feb. 6, 2015 From the Japanese Patent Office Re. Application No. 2012-548535 and Its Translation Into English.
Notice of Reason for Rejection Dated Nov. 25, 2014 From the Japanese Patent Office Re. Application No. 2012-548534 and Its Translation Into English.
Official Action Dated Oct. 1, 2014 From the US Patent and Trademark Office Re. U.S. Appl. No. 14/468,395.
Official Action Dated Aug. 11, 2014 From the US Patent and Trademark Office Re. U.S. Appl. No. 13/521,249.
Official Action Dated Jan. 16, 2014 From the US Patent and Trademark Office Re. U.S. Appl. No. 13/521,249.
Official Action Dated Jul. 23, 2013 From the US Patent and Trademark Office Re. U.S. Appl. No. 13/388,069.
Official Action Dated Feb. 25, 2014 From the US Patent and Trademark Office Re. U.S. Appl. No. 13/388,069.
Official Action Dated Feb. 25, 2014 From the US Patent and Trademark Office Re. U.S. Appl. No. 13/521,252.
Official Action Dated Aug. 28, 2014 From the US Patent and Trademark Office Re. U.S. Appl. No. 13/388,069.

* cited by examiner

METHOD AND SYSTEM FOR ADJUSTING DEPTH VALUES OF OBJECTS IN A THREE DIMENSIONAL (3D) DISPLAY

RELATED APPLICATION

This application is a continuation of U.S. patent application Ser. No. 13/521,249 filed on Jul. 10, 2012, which is a National Phase of PCT Patent Application No. PCT/IL2011/000048 having International filing date of Jan. 13, 2011, which claims the benefit of priority under 35 USC §119(e) of U.S. Provisional Patent Application No. 61/294,843 filed on Jan. 14, 2010. The contents of the above applications are all incorporated herein by reference as if fully set forth herein in their entirety.

FIELD AND BACKGROUND OF THE INVENTION

The present invention, in some embodiments thereof, relates to three dimensional (3D) imaging printing and, more particularly, but not exclusively, to three dimensional imaging in autostereoscopy.

Autostereoscopy is any method of displaying stereoscopic images without the use of special headgear or glasses on the part of the viewer. Examples of autostereoscopic displays include parallax barrier, lenticular, volumetric, electro-holographic, and light field displays. Autostereoscopy may be used to produce images with an illusion of depth. However, elements with fixed optics to produce the illusion of depth have a number of limitations. For example, when lenticular lens array or a parallax barrier is used, physical limitations prevent the display of a depth of field beyond certain ranges. For example, when motion is displayed and lenticules are arranged to be oriented horizontally to provide the clearest motion image during viewing, no depth of field can be provided. Even when a three-dimensional effect is generated, the depth of field possible is limited by physical characteristics of the lens sheet itself, such as the desired small pitch (that is, width) of the lenticules so that they are not visible to a user's eye. This, in turn, limits the possible spacing between image lines to obtain a depth of field, particularly bearing in mind the contrary requirement that the user would like to see as many images as possible.

SUMMARY OF THE INVENTION

According to some embodiments of the present invention, there is provided a method of setting a plurality of depth values of a plurality of objects in a scene. The method comprises providing an image dataset depicting a scene comprising a plurality of objects having a plurality of depth values with a plurality of depth differences thereamong, selecting a depth range;

simultaneously adjusting the plurality of depth values while maintaining the plurality of depth differences, the adjusting being limited by the depth range, and instructing the generation of an output image depicting the scene so that the plurality of objects having the plurality of adjusted depth values.

Optionally, the selecting comprises selecting the depth range according to optical characteristics of an image separating mask.

Optionally, the selecting comprises selecting the depth range according to vision limitations of an observer viewing the scene via an image separating mask.

More optionally, the image separating mask is a stereoscopic display.

More optionally, the method further comprises generating an article wherein the output image is viewable via the image separating mask.

Optionally, the adjusting comprises adjusting a convergence plane of the scene while maintaining the plurality of depth differences.

Optionally, adjusting comprises: displaying a plurality of markers each indicative of another the depth value in the depth range, allowing a user to move simultaneously the plurality of markers along a scale, and adjusting the plurality of depth values according to the move.

Optionally, the method further comprises receiving a two dimensional (2D) image from a remote client via a network and converting the 2D image to generate the image dataset wherein each the object has a separately adjustable depth.

Optionally, the instructing comprises rendering the output image on a stereoscopic display.

Optionally, the instructing comprises printing the output image.

More optionally, the image separating mask is selected from a group consisting of a parallax barrier, a lenticular lenses array, a multi image display screen, a stereoscopic display, and an array of lenses for integral photography (IP).

According to some embodiments of the present invention, there is provided a method of presenting a user interface for adjusting a plurality of depth values of a plurality of objects of a scene. The method comprises displaying an image dataset depicting a scene comprising a plurality of objects having a plurality of depth values with a plurality of depth differences thereamong, displaying a scale defining a depth range, allowing a user to adjust simultaneously the plurality of depth values by moving a single marker in relation to the scale, and generating an output image depicting the scene so that the depth of the plurality of objects being set according to the plurality of adjusted depth values.

Optionally, the depth range is selected according to optical characteristics of an image separating mask; the output image is viewable via the image separating mask.

Optionally, the moving comprises moving a plurality of object markers simultaneously, each the object marker marking another of the plurality of depth values in the depth range.

According to some embodiments of the present invention, there is provided a computer program product, comprising at least one computer usable medium having a computer readable program code embodied therein, the computer readable program code adapted to be executed to implement a method of setting a plurality of depth values of a plurality of objects in a scene. The method comprises providing an image dataset depicting a scene comprising a plurality of objects having a plurality of depth values with a plurality of depth differences thereamong, selecting a depth range;

simultaneously adjusting the plurality of depth values while maintaining the plurality of depth differences, the adjusting being limited by the depth range, and instructing the generation of an output image depicting the scene so that the plurality of objects having the plurality of adjusted depth values.

According to some embodiments of the present invention, there is provided a device of setting a plurality of depth values of a plurality of objects in a scene. The device comprises a receiving unit which receives an image dataset depicting a scene comprising a plurality of objects having a plurality of depth values with a plurality of depth differences thereamong, a user interface module which allows user to simultaneously adjust the plurality of depth values while maintaining the plurality of depth differences, the adjusting being limited by a depth range, and an output module which instructs the generation of an output image depicting the scene so that the plurality of objects having the plurality of adjusted depth values.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of a method of setting a plurality of depth values of a plurality of objects viewable via an image separating mask, according to some embodiments of the present invention;

FIG. 2 is a schematic illustration of a graphical user interface (GUI) for presenting a received image dataset, according to some embodiments of the present invention;

FIG. 3 is a schematic illustration of the GUI depicted in FIG. 1, wherein an indicator of a selected layer marker is enlarged, according to some embodiments of the present invention;

FIG. 4 is a schematic illustration of a stereoscopic display device, according to some embodiments of the present invention;

FIG. 5 is a schematic illustration of a printing system, according to some embodiments of the present invention; and FIG. 6 is a flowchart of a method of presenting a user interface, for adjusting depth values of a plurality of objects viewable via an image separating mask, according to some embodiments of the present invention.

DESCRIPTION OF EMBODIMENTS OF THE INVENTION

Figure 1:
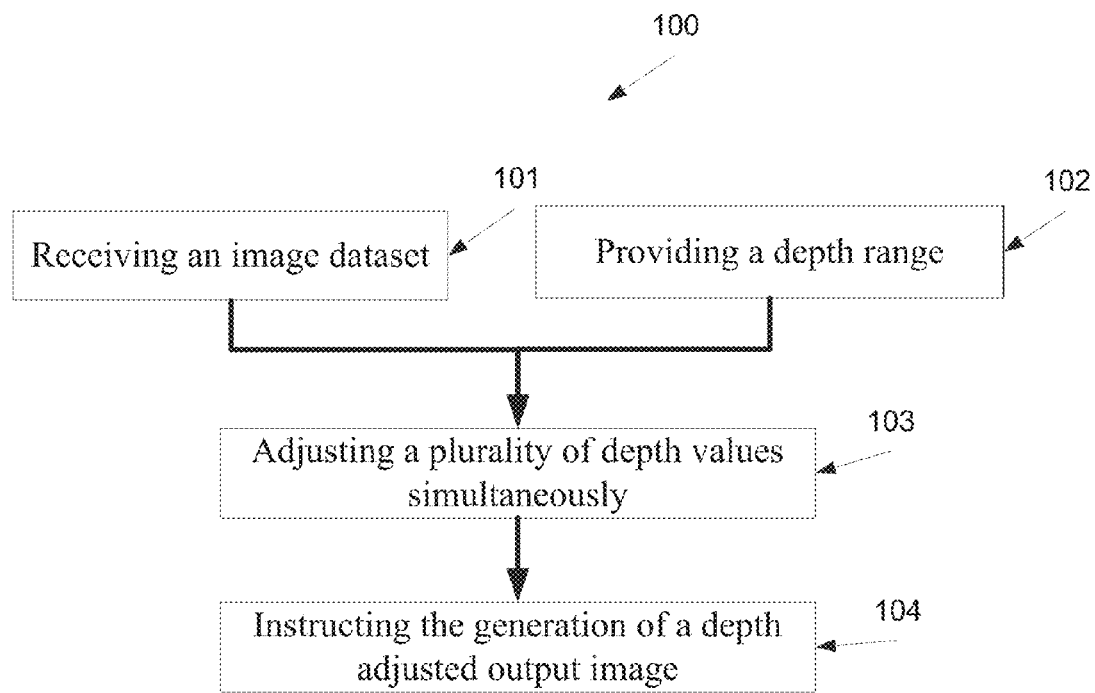

The present invention, in some embodiments thereof, relates to three dimensional imaging printing and, more particularly, but not exclusively, to three dimensional imaging in autostereoscopy.

According to some embodiments of the present invention, there is provided methods and systems of setting a plurality of depth values of a plurality of objects in a scene viewable via an image separating mask. The method is based on adjusting the plurality of depth values simultaneously in a depth range set according to optical characteristics of the image separating mask and/or vision limitation of a human observer. First, an image dataset depicting a scene comprising a plurality of objects having a plurality of depth values with a plurality of depth differences thereamong is received. In addition, a depth range is selected. Than the plurality of depth values are simultaneously adjusted while the depth differences are maintained. The adjusting is limited by the depth range. This allows instructing the generation of an output image depicting the scene so that the objects are depicted with the adjusted depth values.

According to some embodiments of the present invention, there is provided a device and a method of presenting a user interface, such as a graphical user interface, for adjusting a plurality of depth values of a plurality of objects of a scene viewable via an image separating mask. The method is based on displaying an image dataset depicting a scene that depicts a plurality of objects having a plurality of depth values with a plurality of depth differences thereamong. In addition, a scale defining a depth range set according to optical characteristics of an image separating mask and/or according to the vision characteristics of an observer is displayed to the user. This allows the user to adjust simultaneously the depth values by moving a single marker in relation to the scale. The device and method allow generating an output image that depicts the scene so that the depth of the plurality of objects is set according to the adjusted depth values.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart of a method 100 of setting a plurality of depth values of a plurality of objects viewable via an image separating mask, according to some embodiments of the present invention. As used herein, an image separating mask means a barrier, such as a parallax barrier, a lenticular lenses array, a multi image display screen, an array of lenses for integral photography (IP), for example as described in U.S. Pat. No. 5,800,907, filed on May 23, 1996 that is incorporated herein by reference and any display for displaying a multi dimensional image. As used herein, a depth value is a value indicative of a desired emulated depth of one or more objects in a scene in relation to other objects in the scene or in relation to a reference plane, such as a convergence plane, also known as a zero plane. The depth value may be a depth of a flat object, indicating the depth thereof all along its visible area and/or a cumulative value which is set according the depth of an uneven object, indicating the average of various depths along its visible area, the median of various depths along its visible area, and the like. The method may be implemented in a client terminal, such as a personal computer, a server, a laptop, thin client, a tablet, a kiosk in a photo shop, a personal digital assistant (PDA), or any other computing unit, and/or a remote terminal, such as a server or a network node that is accessible to a user via a network, such as the internet.

First, as shown at 101, an image dataset which depicts a scene comprising a plurality of objects is provided. The image dataset is optionally a two dimensional (2D) image and/or a multilayered image wherein each object is represented in a different layer. Optionally, the 2D image is processed to form a multilayered image by identifying, manually or automatically, different objects and generating accordingly different layers. For example, a marking tool may be used by the user to crop objects from a received 2D image. Each cropped object is converted to a single object in a layer. For brevity, layers and objects are referred to herein interchangeably. The 2D image may be locally selected and/or captured, for example when the method is implemented on a terminal that includes a man machine interface (MMI), such as a keyboard, a pointing device and a display and/or a touch screen. The 2D image may be received from a remote network node via a network, for example when the method is implemented on a central network node, such as a web server that is connected to a network, such as the internet. Optionally, the marking tool allows the user to assign a flat depth and/or a non-flat depth to layers, for example by adding a given depth map to a given layer. Optionally, the marking tool allows the user to scale positions of layers, for example by applying one or more scaling transformations on a depth axis. Additionally or alternatively, the marking tool allows the user to apply a transformation to some or all of the layers as a composition, for example to rotate the scene and/or scale the scene in any of the axes (up-down, left-right, and/or in-out).

Now, as shown at 102, a depth range is provided, for example selected, according to one or more optical characteristics of an image separating mask and/or according to one or more human eyesight limitations. An image separating mask, such as a lenticular lens array or a parallax barrier, has physical limitations which prevent the display of a depth of field beyond a certain range. Namely, the depth range of the image separating mask is influenced by properties such as the size of the image separating mask, the ability of the optics to present clearly each view, and the like. The depth range further depends on other factors, such as limitations of the human eyes to combine correctly pairs of stereoscopic images. As the image separating mask is an auto stereoscopic display which displays a plurality of views, the mixing of these views by the optics of the image separating mask further limits the potential depth range of a scene displayed via the image separating mask.

Figure 2:
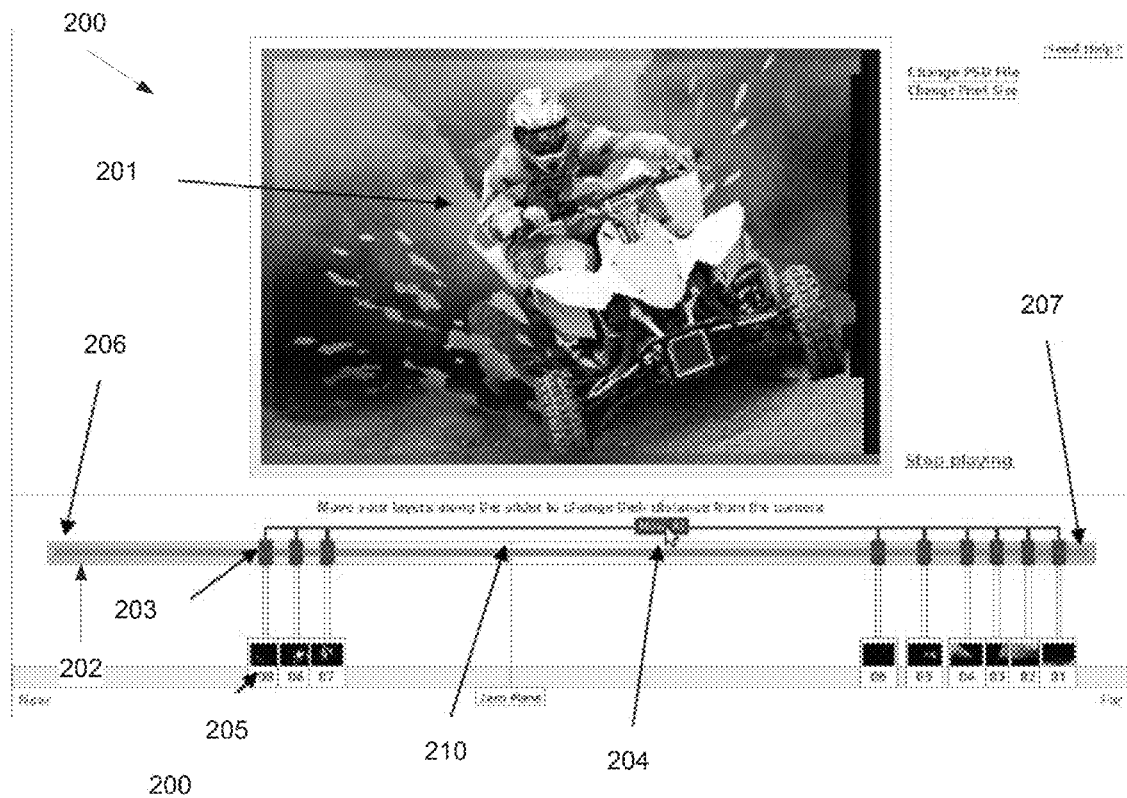
Figure 3:
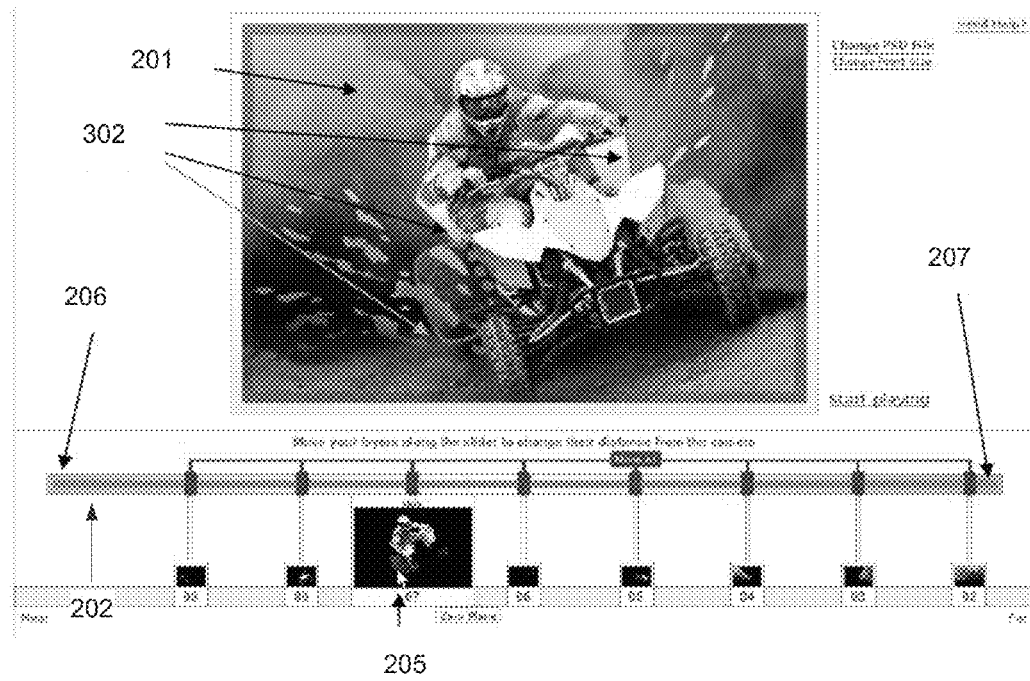

Reference is now also made to FIG. 2, which is a schematic illustration of a graphical user interface (GUI) 200 for presenting the received image dataset, for example as indicated by numeral 201, according to some embodiments of the present invention. As outlined above, the GUI is executed on a local client terminal, such as a desktop, a laptop, or a tablet and/or on a network node, such as a web server. The GUI 200 includes a scale 202, which is optionally adapted to the provided depth range. The scale 202 has near and far points (edges) 206, 207 which are defined according to the provided depth range, for example the minimal and maximal depth values. In relation to this scale 202, optionally on it, layer markers, also referred to herein as object markers, are displayed, for example as shown by 203. Each layer marker is located on the scale 202 in a manner that is indicative of its depth value in relation to other layer markers on the scale 202. Optionally, each layer marker 203 comprises a layer indicator, such as a thumbnail, for example as shown at 205. The user may choose a layer and change its depth as example by selecting any of the layer markers or respective indicators, for example by using a pointer of a pointing device or a touch screen. Optionally, as shown by numeral 301 of FIG. 3, an indicator of a selected layer marker is enlarged upon selection. Additionally or alternatively, as shown as shown by numeral 302 of FIG. 3, the selected layer is highlighted or otherwise indicated in the scene 201 upon selection. Optionally, all the layer markers 203 are connected to and/or associated with a central layer marker 204 which may be used to control all the layer markers simultaneously, within the boundaries of the scale 202. The GUI 200 optionally depicts a convergence plane depth indicator 210 that is indicative of the depth of the convergence plane in the depth range, for example on the scale 202. As used herein, a convergence plane, also known as a key plane or a zero parallax plane, is the point or layer in a 3D image where no depth is perceived because both the left and right eyes receive the same information.

The GUI 200 allows the user, as shown at 103, to adjust, simultaneously and respectively, a depth value of each of one of the objects and/or layers in the scene, within the boundaries of the range depth that is defined by the scale 202. For example, the user may move the central layer marker 204 along the scale 202 to adjust the depth values of all the layers simultaneously. The depth values may be increased or decreased simultaneously while the differences among the depth values are maintained. As the scale 202 is defined according to the provided depth range, the adjustment of the depth values is limited to the depth range. In such a manner, the user can only adjust depth values in the depth range and not outside of the depth range. In another example, the user may move the scale 202, or any other indicator that is indicative of the provided depth range, while the distances between the depth values among the layers remain static.

Additionally or alternatively, the GUI 200 allows the user to adjust, simultaneously and respectively, the convergence plane of the scene 201, for example by moving the convergence plane depth indicator 210 along the scale 202. Optionally, the convergence plane of the scene 201 is adjusted while the differences (interspaces) between the depths values remain unchanged. The adjustment of the convergence plane is optionally limited by the provided depth range and the depth values in the depth range. For example, if one or more of the depth values are in proximity to the maximum and/or minimum edges of the depth range, the adjustment of the convergence plane is limited in a range having a width equal to the smallest difference between the any of the depth values and the maximum and/or minimum edges. The limiting of the adjustment of the convergence plane prevents from a user to change depth values of a layer to deviate from the depth range.

After the user adjusted the depth values, as shown at 104, the generation of an output image which depicts the scene with the depth adjusted objects is instructed. Optionally, the output image is an interlaced composite image that is later attached to a lenticular imaging article. In such a manner, the method 100 is used to adjust the depth value of objects which are presented in a lenticular imaging article. The lenticular imaging article is optionally generated as known in the art, for example as described in International Patent Application NO. WO2008/087632, which is incorporated herein by reference. Additionally or alternatively, the output image is set to be projected and/or rendered on an image separating mask used as a stereoscopic display. In such an embodiment, the output image may be projected and/or rendered before, during and/or after the adjustment of the depth values.

Figure 4:
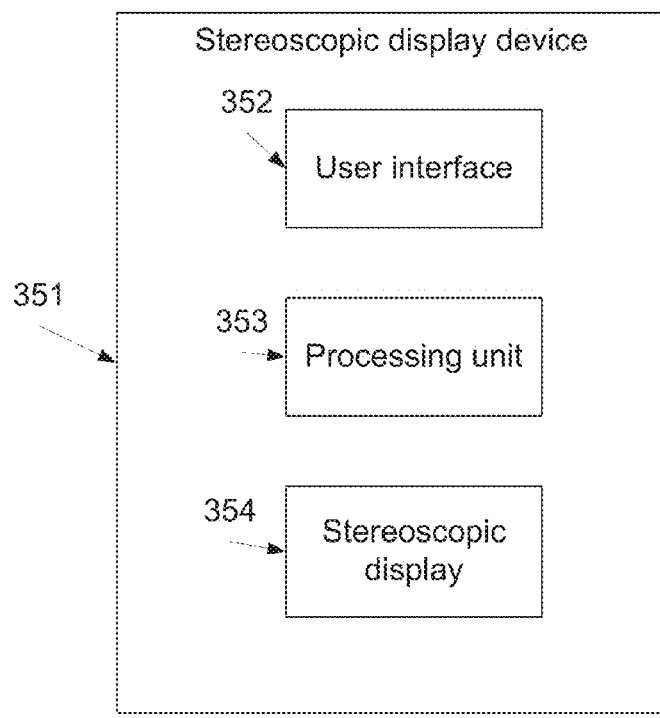
Figure 5:
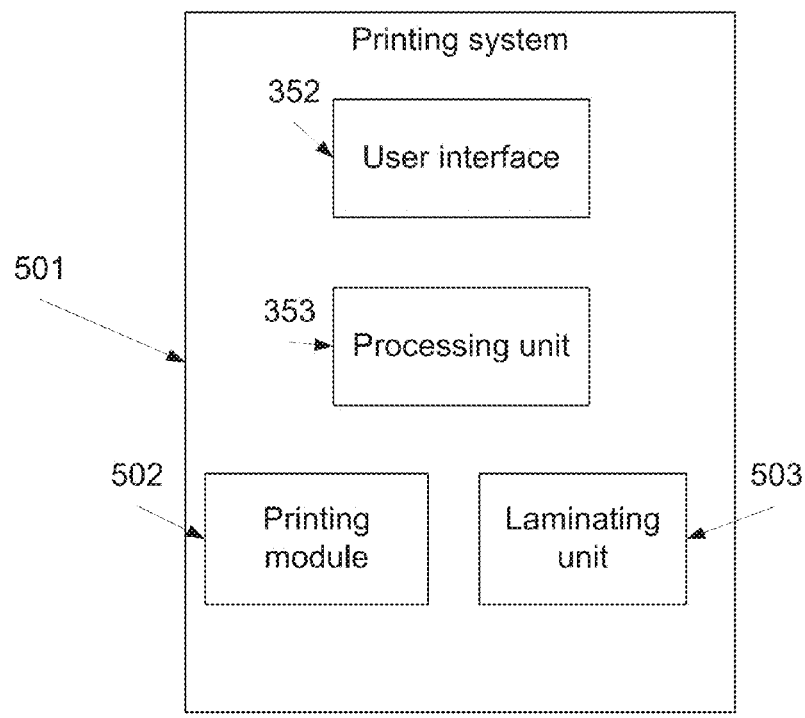

For example, reference is now made to FIG. 4, which is a schematic illustration of a stereoscopic display device 351, according to some embodiments of the present invention. The stereoscopic display device 351 includes a user interface 352, a processing unit 353, and a stereoscopic display 354. The processing unit 353 is set to receive a depth range and an image dataset, as described above. The user interface 352 is set to present a GUI to a user, for example as described above. The processing unit 353 processes the objects and their depth in order to create image data to be displayed on the stereoscopic display 354. The GUI is configured to include means to set depth for the layers and optionally configured to include means for the user to move all layers, for example as described above. Another example is depicted in FIG. 5, which is a schematic illustration of a printing system 501, according to some embodiments of the present invention. The printing system 501 includes the user interface 352 and the processing unit 353 which are depicted in FIG. 4. However, the printing system 501 includes a printing module 502 instead of the stereoscopic display 354. Optionally, as shown at 503, the printing system 501 includes a lamination unit to laminate printed images to the flat side of an image separating mask, such as a lenticular lens array. In such an embodiment, depth adjusted images are printed and optionally laminated by the printing module 502 and the laminating unit 503.

Figure 6:
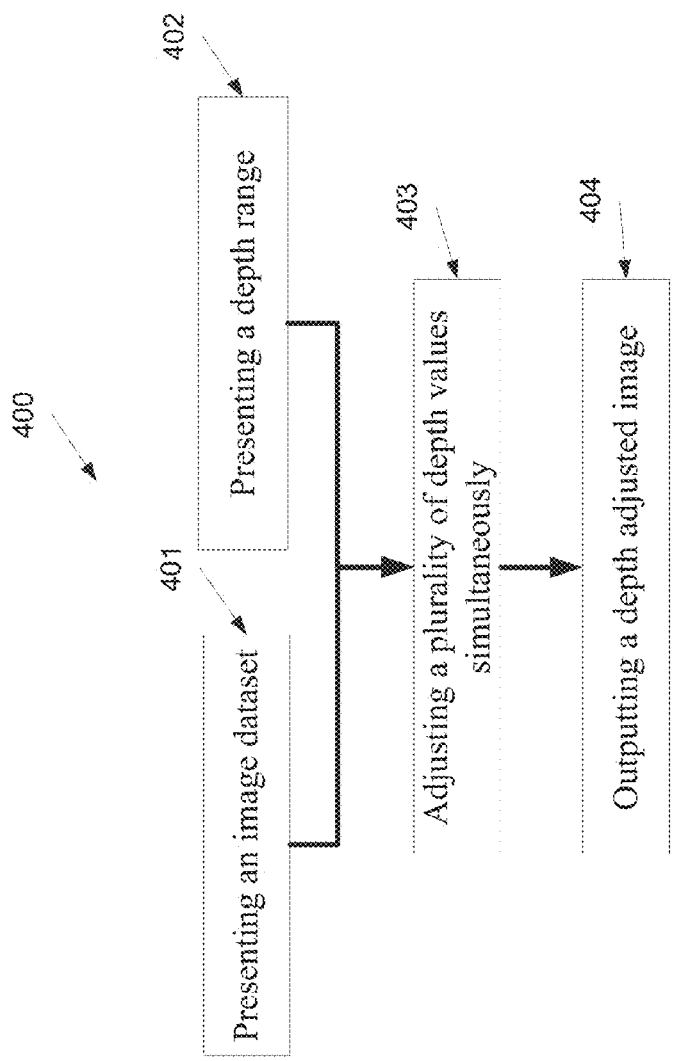

Reference is now made to FIG. 6, which is a flowchart of a method of presenting a user interface, such as the user interface depicted in FIG. 2, for adjusting depth values of a plurality of objects viewable via an image separating mask, according to some embodiments of the present invention. First, as shown at 401, an image dataset, such as a 2D image and/or a multilayered image, is presented to a user. The image dataset depicts a scene having a plurality of objects, which are optionally depth adjustable. For example, each object is represented in a different layer and/or has a different depth value. In addition, as shown at 402, a possible depth range is displayed to the user, for example in a scale, such as the scale depicted in 202. The possible depth range defines a depth range, which is optionally set dynamically according to optical characteristics of an image separating mask. As shown at 403, the presented scale and image dataset allow the user to adjust simultaneously and respectively a depth value of the plurality of objects by moving a single marker, such as the central layer marker 204, in relation to the scale. Now, as shown at 404, a depth adjusted output image depicting the scene at the image dataset is generated so that the depth of the objects therein is set according to the adjusted depth values.

It is expected that during the life of a patent maturing from this application many relevant systems and methods will be developed and the scope of the term display, user interface, and computing unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of setting a plurality of depth values of a plurality of objects in a scene, comprising:
   providing an image dataset depicting a scene comprising a plurality of objects having a plurality of depth values with a plurality of depth differences thereamong;
   selecting a depth range according to optical characteristics of an image separating mask;
   displaying a plurality of layer markers to a user, each one of said plurality of layer markers is indicative of another of said plurality of layers;
   identifying a user input wherein one of said plurality of layer markers is moved by said user;
   simultaneously adjusting said plurality of depth values while maintaining said plurality of depth differences, said adjusting being limited by said depth range; and
   instructing the generation of an article having said image separating mask and an output image depicting said scene and presented to be viewable via said image separating mask so that said plurality of objects having said plurality of adjusted depth values.

2. The method of claim 1, wherein said selecting comprises selecting said depth optical characteristics according to a user selection.

3. The method of claim 2, wherein said image separating mask is a stereoscopic display.

4. The method of claim 2, wherein said output image is projected on said image separating mask.

5. The method of claim 2, wherein said image separating mask is selected from a group consisting of a parallax barrier, a lenticular lenses array, a multi image display screen, a stereoscopic display, and an array of lenses for integral photography (IP).

6. The method of claim 1, wherein said selecting comprises selecting said depth range according to vision limitations of an observer viewing said scene via an image separating mask.

7. The method of claim 1, wherein said adjusting comprises adjusting a convergence plane of said scene while maintaining said plurality of depth differences.

8. The method of claim 1, wherein adjusting comprises:
   displaying a plurality of markers each indicative of another said depth value in said depth range,
   allowing a user to move simultaneously said plurality of markers along a scale, and
   adjusting said plurality of depth values according to said move.

9. The method of claim 1, further comprising receiving a two dimensional (2D) image from a remote client via a network and converting said 2D image to generate said image dataset wherein each said object has a separately adjustable depth.

10. The method of claim 1, wherein said instructing comprises rendering said output image on a stereoscopic display.

11. The method of claim 1, wherein said instructing comprises printing said output image.

12. The method of claim 1, wherein said user interface module is adapted to adjust a convergence plane of said scene while maintaining said plurality of depth differences.

13. A computer program product, comprising at least one non-transitory computer usable medium having a computer readable program code embodied therein, said computer readable program code adapted to be executed to implement a method of setting a plurality of depth values of a plurality of objects in a scene, said method comprises:
   providing an image dataset depicting a scene comprising a plurality of objects having a plurality of depth values with a plurality of depth differences thereamong;
   selecting a depth range according to optical characteristics of an image separating mask;
   displaying a plurality of layer markers to a user, each one of said plurality of layer markers is indicative of another of said plurality of layers;
   identifying a user input wherein one of said plurality of layer markers is moved by said user;
   simultaneously adjusting said plurality of depth values while maintaining said plurality of depth differences, said adjusting being limited by said depth range; and
   instructing the generation of an article having said image separating mask and an output image depicting said scene and presented to be viewable via said image separating mask so that said plurality of objects having said plurality of adjusted depth values.

14. A device of setting a plurality of depth values of a plurality of objects in a scene, comprising:
   a receiving unit adapted to receive an image dataset depicting a scene comprising a plurality of objects having a plurality of depth values with a plurality of depth differences thereamong;
   a user interface module adapted to allow user to simultaneously adjust said plurality of depth values while maintaining said plurality of depth differences, said adjusting being limited by a depth range selected according to optical characteristics of an image separating mask; and
   an output module adapted to instruct the generation of an article having said image separating mask and an output image depicting said scene and presented to be viewable via said image separating mask so that said plurality of objects having said plurality of adjusted depth values.

15. The device of claim 14, wherein said user interface module receives a user selection indicative of said depth optical characteristics.

16. The device of claim 14, wherein said image separating mask is a stereoscopic display.

17. The device of claim 14, wherein said output image is projected on said image separating mask.

* * * * *